US011952983B2

United States Patent
Glavind et al.

(10) Patent No.: US 11,952,983 B2
(45) Date of Patent: Apr. 9, 2024

(54) METHOD OF DETERMINING ORIENTATION OF A NACELLE

(71) Applicant: Vestas Wind Systems A/S, Aarhus N (DK)

(72) Inventors: Lars Glavind, Langå (DK); Johnny Nielsen, Svenstrup J (DK)

(73) Assignee: Vestas Wind Systems A/S, Aarhus N. (DK)

( * ) Notice: Subject to any disclaimer, the term of this patent is extended or adjusted under 35 U.S.C. 154(b) by 44 days.

(21) Appl. No.: 17/784,189

(22) PCT Filed: Dec. 15, 2020

(86) PCT No.: PCT/DK2020/050364
§ 371 (c)(1),
(2) Date: Jun. 10, 2022

(87) PCT Pub. No.: WO2021/121506
PCT Pub. Date: Jun. 24, 2021

(65) Prior Publication Data
US 2023/0032161 A1 Feb. 2, 2023

(30) Foreign Application Priority Data
Dec. 20, 2019 (DK) .......................... PA 2019 70824

(51) Int. Cl.
F03D 7/02 (2006.01)
F03D 7/04 (2006.01)
(Continued)

(52) U.S. Cl.
CPC ......... *F03D 7/0296* (2013.01); *F03D 7/0204* (2013.01); *F03D 7/042* (2013.01);
(Continued)

(58) Field of Classification Search
CPC ...... F03D 7/0224; F03D 7/028; F03D 7/0296; F03D 7/042; F03D 17/00; G01S 19/14
See application file for complete search history.

(56) References Cited

U.S. PATENT DOCUMENTS 8,803,351 B2 * 8/2014 Dalsgaard ............... F03D 7/042
290/55
10,584,683 B2 * 3/2020 Lysgaard ................ G06T 7/001
(Continued)

FOREIGN PATENT DOCUMENTS

CN 107630794 A 1/2018
EP 2333316 A2 6/2011
(Continued)

OTHER PUBLICATIONS

Danish Patent and Trademark Office, Search and Examination Report in PA 2019 70824, dated Jun. 11, 2020.
European Patent Office, International Search Report and Written Opinion in PCT/DK2020/050364, dated Feb. 24, 2021.

*Primary Examiner* — Tulsidas C Patel
*Assistant Examiner* — Thomas K Quigley
(74) *Attorney, Agent, or Firm* — Wood Herron & Evans LLP

(57) ABSTRACT

A method of determining an orientation of a nacelle of a wind turbine, wherein the nacelle carries a Global Navigation Satellite System (GNSS) sensor, the method comprising: yawing the nacelle between a series of orientations; obtaining locus data based on a series of calibration positions measured by the GNSS sensor, wherein each calibration position is measured by the GNSS sensor when the nacelle is in a respective orientation of the series of orientations; storing the locus data; after storing the locus data, measuring a new position with the GNSS sensor; and determining the orientation of the nacelle on the basis of the stored locus data and the new position.

17 Claims, 8 Drawing Sheets

(51) Int. Cl.
F03D 17/00 (2016.01)
G01S 19/14 (2010.01)
G01S 19/42 (2010.01)
*G01S 19/26* (2010.01)

(52) U.S. Cl.
CPC ............ F03D 17/00 (2016.05); G01S 19/14 (2013.01); G01S 19/42 (2013.01); *F05B 2270/329* (2013.01); *F05B 2270/802* (2013.01); *G01S 19/26* (2013.01)

(56) References Cited

U.S. PATENT DOCUMENTS

| | | | | |
|---|---|---|---|---|
| 2013/0110414 A1* | 5/2013 | Caponetti | ............... | F03D 7/042 |
| | | | | 702/35 |
| 2013/0287567 A1* | 10/2013 | Olesen | ................. | F03D 7/0288 |
| | | | | 416/61 |
| 2016/0032897 A1* | 2/2016 | Hawkins | .................. | G01S 3/54 |
| | | | | 342/417 |
| 2017/0130700 A1* | 5/2017 | Sakaguchi | ............... | F03D 17/00 |
| 2017/0234304 A1* | 8/2017 | Sakaguchi | ............ | F03D 7/0204 |
| | | | | 73/112.01 |
| 2018/0372886 A1* | 12/2018 | Weber | ...................... | G01S 19/14 |
| 2019/0072082 A1* | 3/2019 | Lysgaard | ................ | G06T 7/001 |
| 2020/0158092 A1* | 5/2020 | Lysgaard | ................ | G06T 7/001 |
| 2021/0270236 A1* | 9/2021 | Neto | ........................ | F03D 1/02 |

FOREIGN PATENT DOCUMENTS

| | | | | |
|---|---|---|---|---|
| EP | 2599993 A1 | 6/2013 | | |
| WO | 2016008500 A1 | 1/2016 | | |
| WO | WO-2017102986 A1 * | 6/2017 | ........... | F03D 7/0212 |

* cited by examiner

METHOD OF DETERMINING ORIENTATION OF A NACELLE

FIELD OF THE INVENTION

The present invention relates to a method of determining an orientation of a nacelle.

BACKGROUND OF THE INVENTION

Determination of the orientation of a nacelle of a wind turbine, for example relative to true (geographical) North, may be important for a number of reasons. Firstly, since the nacelle is normally pointed into the wind, its orientation may be used as an indication of the wind direction. This indication may be used to analyse the performance of the wind turbine. For example the wind turbine may not be producing as much power as expected for a given wind strength, because the wind turbine is in the wake of another wind turbine. Thus if the wind direction is known, then such underperformance can be accounted for. Alternatively, the wind direction may be used to modify the operation of the wind turbine. For example it may be known that if the wind is coming from a certain direction, then a large amount of wind shear is expected so the wind turbine is derated.

The orientation of a wind turbine may be determined manually—for instance by standing some distance behind the turbine in line with the nacelle, then measuring the apparent direction of the wind turbine with a compass. This orientation measurement must then be corrected from magnetic north to true (geographical) North before it is manually input into the wind turbine's control system. Such a method is prone to human error.

SUMMARY OF THE INVENTION

A first aspect of the invention provides a method of determining an orientation of a nacelle of a wind turbine, wherein the nacelle carries a Global Navigation Satellite System (GNSS) sensor, the method comprising: yawing the nacelle between a series of orientations; obtaining locus data based on a series of calibration positions measured by the GNSS sensor, wherein each calibration position is measured by the GNSS sensor when the nacelle is in a respective orientation of the series of orientations; storing the locus data; after storing the locus data, measuring a new position with the GNSS sensor; and determining the orientation of the nacelle on the basis of the stored locus data and the new position.

Determining the orientation of the nacelle may comprise identifying a position in the locus data that is closest to the new position; and identifying an orientation of the nacelle corresponding with the identified position. The identified position in the locus data may be one of the calibration positions measured by the GNSS sensor, or some other position recorded by the locus data. The locus data may be stored as a look-up table which enables the orientation of the nacelle to be looked up on the basis of the identified position.

The GNSS sensor may move on a circle centred on a yaw axis, and the locus data may be indicative of a position of the yaw axis. For instance the locus data may comprise (or consist of) position coordinates of the yaw axis.

The stored locus data may define a frame of reference, and the new position may be converted into that frame of reference then used to determine the orientation of the nacelle by trigonometry.

The locus data may comprise a collation of the calibration positions, or a geometrical function (such as a circle) based on the calibration positions.

The locus data may comprise multiple sets of locus data, each set of locus data corresponding to a different level of thrust experienced by the wind turbine. For instance each set of locus data may comprise a look-up table (or part of a look-up table) containing a set of calibration positions corresponding with a respective level of thrust.

Each set of locus data may be obtained by yawing the nacelle between a series of orientations with the wind turbine experiencing a respective one of the different levels of thrust; and obtaining the set of locus data on the basis of a series of calibration positions measured by the GNSS sensor.

The orientation of the nacelle may be determined by selecting one of the sets of locus data based on the new position, and determining the orientation of the nacelle on the basis of the selected one of the sets of locus data.

The method may further comprise the step of determining a correction angle associated with a position of the GNSS sensor on the nacelle, and determining the orientation of the nacelle on the basis of the correction angle.

The correction angle may be determined by using an accelerometer to determine a direction of vibration of the wind turbine, and determining the correction angle on the basis of the direction of vibration.

The orientation of the nacelle may be determined on the basis of a known position of the sensor on the nacelle. The known position of the sensor on the nacelle may be obtained by measurement or by design. For example the sensor may be known by design to be positioned centrally on the nacelle. Alternatively the position of the sensor on the nacelle may be obtained by directed measurement, or by using an accelerometer to determine a direction of vibration of the wind turbine, and determining an angular position of the sensor on the nacelle on the basis of the direction of vibration.

The calibration positions and the new position may be measured by the GNSS sensor relative to a constellation of satellites and a terrestrial base module.

The nacelle may carry multiple Global Navigation Satellite System (GNSS) sensors, the locus data may be obtained based on a series of calibration positions measured by the GNSS sensors, wherein each calibration position is measured by the GNSS sensors when the nacelle is in a respective orientation of the series of orientations; the GNSS sensors may each measure a respective new position; and the orientation of the nacelle may be determined based on the stored locus data and the new positions of the GNSS sensors.

The orientation of the nacelle determined by the method may be a geographic bearing (for example a bearing relative to geographic or true North).

According to a further aspect of the invention, there is provided a wind turbine comprising: a tower; a nacelle rotatably mounted on the tower; a Global Navigation Satellite System (GNSS) sensor carried by the nacelle; and a control system configured to: yaw the nacelle between a series of orientations; obtain locus data based on a series of calibration positions measured by the GNSS sensor, wherein each calibration position is measured by the GNSS sensor when the nacelle is in a respective orientation of the series of orientations; store the locus data; after storing the locus data, measure a new position with the GNSS sensor; and determine an orientation of the nacelle on the basis of the stored locus data and the new position.

The control system may be configured to determine the orientation of the nacelle by a method according to the first aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
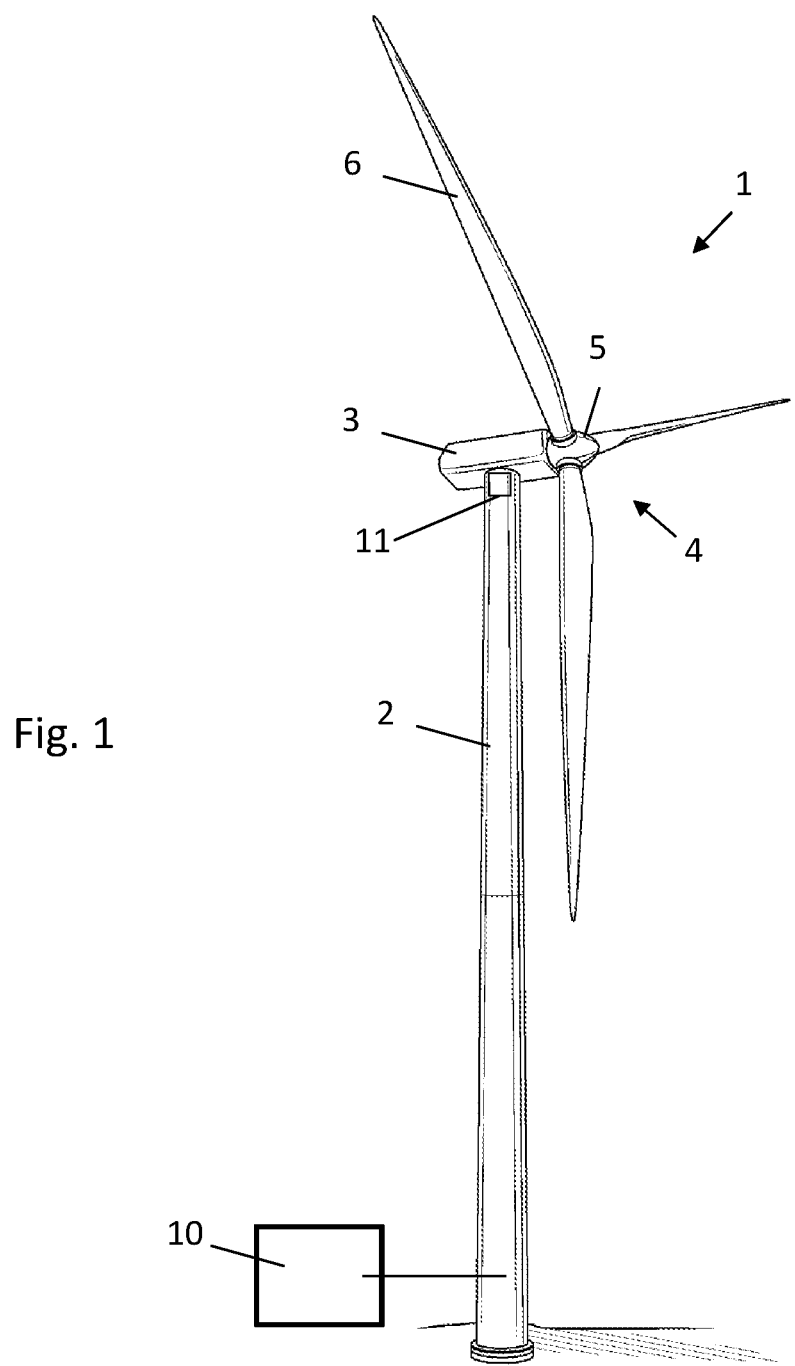
FIG. 1 shows a wind turbine.

FIG. 1 shows a wind turbine 1. The wind turbine 1 has a tower 2 and a nacelle 3 at the top of the tower 2. A wind turbine rotor 4 is connected to the nacelle 3 and arranged to rotate relative to the nacelle 3. The wind turbine rotor 4 comprises a wind turbine hub 5, and multiple wind turbines blades 6 extending from the hub 5. While a wind turbine rotor 4 having three blades 6 is shown, a different number of blades, such as two or four, may be used.

Figure 2A:
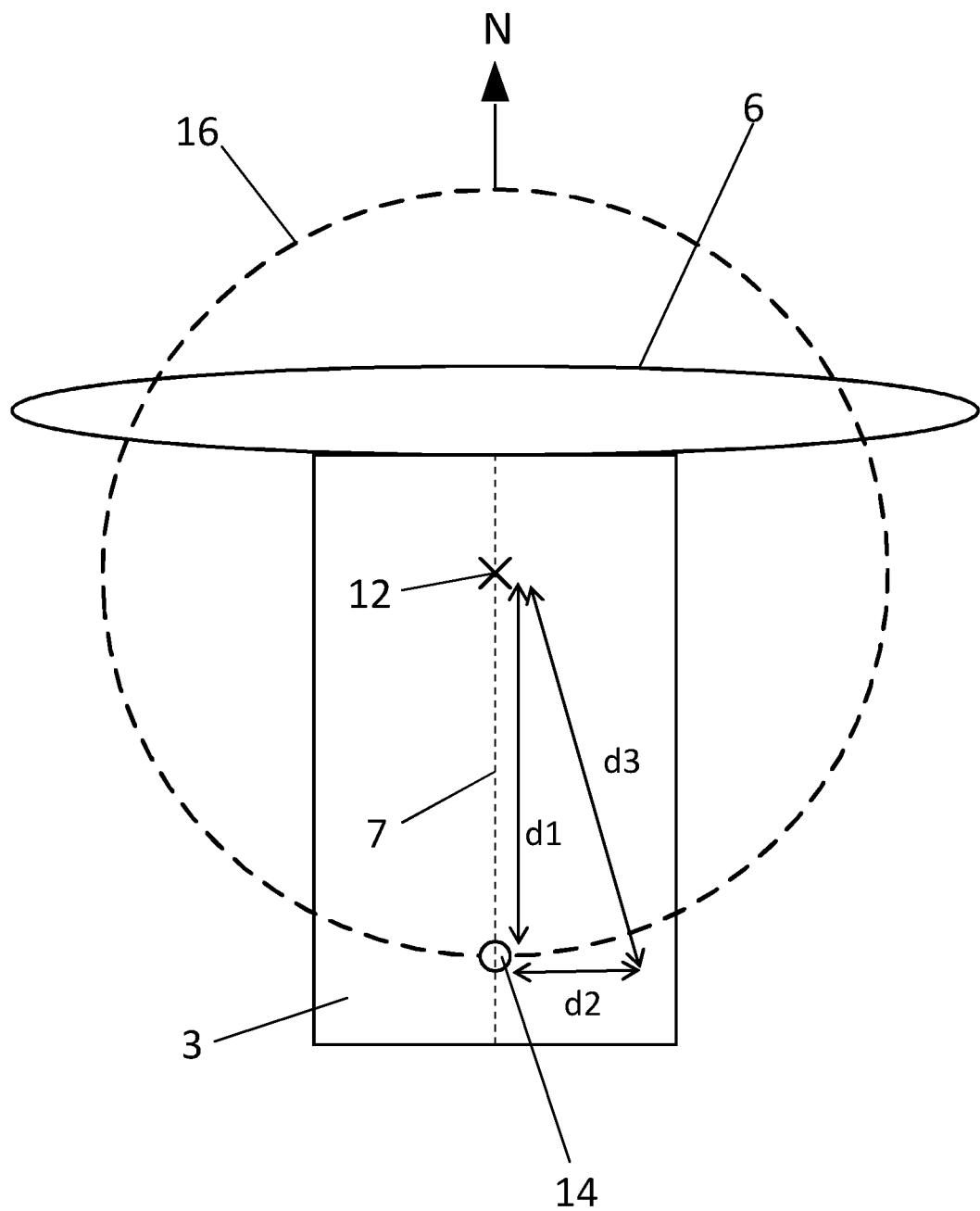
FIG. 2A shows a top-down view of a nacelle according to one embodiment.

FIG. 2A shows the nacelle 3 and wind turbine blades 6 from a top-down perspective. The nacelle 3 can be rotated by a yaw drive system 11 so that it yaws about a vertical yaw axis 12 relative to the tower 2. The nacelle 3 can yaw through a full 360°.

The nacelle 3 carries a GNSS sensor 14. The GNSS sensor 14 may be mounted on top of the nacelle (for example on the cooler top). Alternatively the GNSS sensor 14 may be held by an arm extending from the nacelle, or it may be supported by any other part of the wind turbine which rotates along with the nacelle when the nacelle is yawed.

The GNSS sensor 14 is a position sensor that uses one or more Global Navigation Satellite Systems (such as GPS, Galileo, GLONASS, BeiDou) to determine its position. As the nacelle 3 yaws, the position of the GNSS sensor 14 changes because the GNSS sensor 14 is offset from the yaw axis 12. The GNSS sensor 14 can measure its position with cm accuracy. The position may be recorded as a set of coordinates, for example (longitude, latitude), (x, y) or (r, θ).

The GNSS sensor 14 uses a constellation of satellites to determine its position. Optionally the sensor 14 may enhance the precision of its position measurement using a terrestrial Real Time Kinematic (RTK) base module. This RTK module may be shared between a number of wind turbines in a wind park.

A control system 10 of the wind turbine is indicated at 10 in FIG. 1. In this case the control system 10 is located at the foot of the tower, but it may be at any other location (such as in the nacelle) or it may be distributed across different parts of the wind turbine. The control system 10 is connected to the yaw drive system 11 and the GNSS sensor 14. The control system 10 is configured to determine an orientation of a nacelle of a wind turbine by the methods described below.

The control system 10 directs the yaw drive system 11 to yaw the nacelle 3 between a series of orientations or yaw angles, and a calibration position measurement is made for each orientation. This may be done in a separate calibration routine before the turbine starts operating and generating power. For example, before a wind turbine starts operating it is common to perform a cable twist check in which the nacelle is yawed through a series of revolutions, twisting the cables, until a safety mechanism is triggered, and the nacelle is then yawed back, untwisting the cables. The primary purpose of the cable twist check is to check the safety mechanism, but optionally the calibration position measurements may be made during such a cable twist check. This can provide a large set of calibration position measurements, for example from five revolutions in one direction and five in the opposite direction. Alternatively, the calibration position measurements may be made during an initial phase of the operating life of the wind turbine—for instance during its first year when it can be expected to point in many directions. In this case calibration position measurements may not be available for all directions, but sufficient measurements should be possible.

The series of orientations associated with the calibration position measurements may have an approximately equal distribution over a full 360° rotation. In each orientation the nacelle 3 faces a different direction. At the time illustrated in FIG. 2A, the nacelle 3 is in an orientation in which it is facing true North (i.e. geographic North). For each orientation, the GNSS sensor 14 is in a different position. At each orientation, the GNSS sensor 14 measures a respective calibration position.

Locus data is obtained and stored by the control system 10 based on the series of calibration positions (corresponding to the series of orientations). For example the locus data may comprise a collation of the calibration position measurements. Thus in the case of FIG. 2A the calibration position measurement with the nacelle pointing North may be (0, −1) if the position of the GNSS sensor 14 is recorded in Cartesian (x, y) coordinates. The locus data is indicative of a locus (in this case, a circle 16) travelled by the GNSS sensor 14 as it yaws between the series of orientations.

Rather than storing the locus data as a collation of unprocessed calibration position measurements, the position calibration measurements may be processed so that the locus data is stored in some other way—for instance as a geometrical function, or simply as the coordinates of the centre of the circle 16 (which is also the position of the yaw axis 12).

After the locus data has been stored as explained above, the stored locus data can be used to determine the orientation of the nacelle of the wind turbine. Thus a new position (x1, y1) can be measured with the GNSS sensor 14; and the orientation of the nacelle determined on the basis of the stored locus data and the new position. For example if the new position (x1, y1) is (0.707, −0.707) then the locus data may indicate that the nacelle orientation is north-west. Accuracy within 1 degree is expected.

Figure 2B:
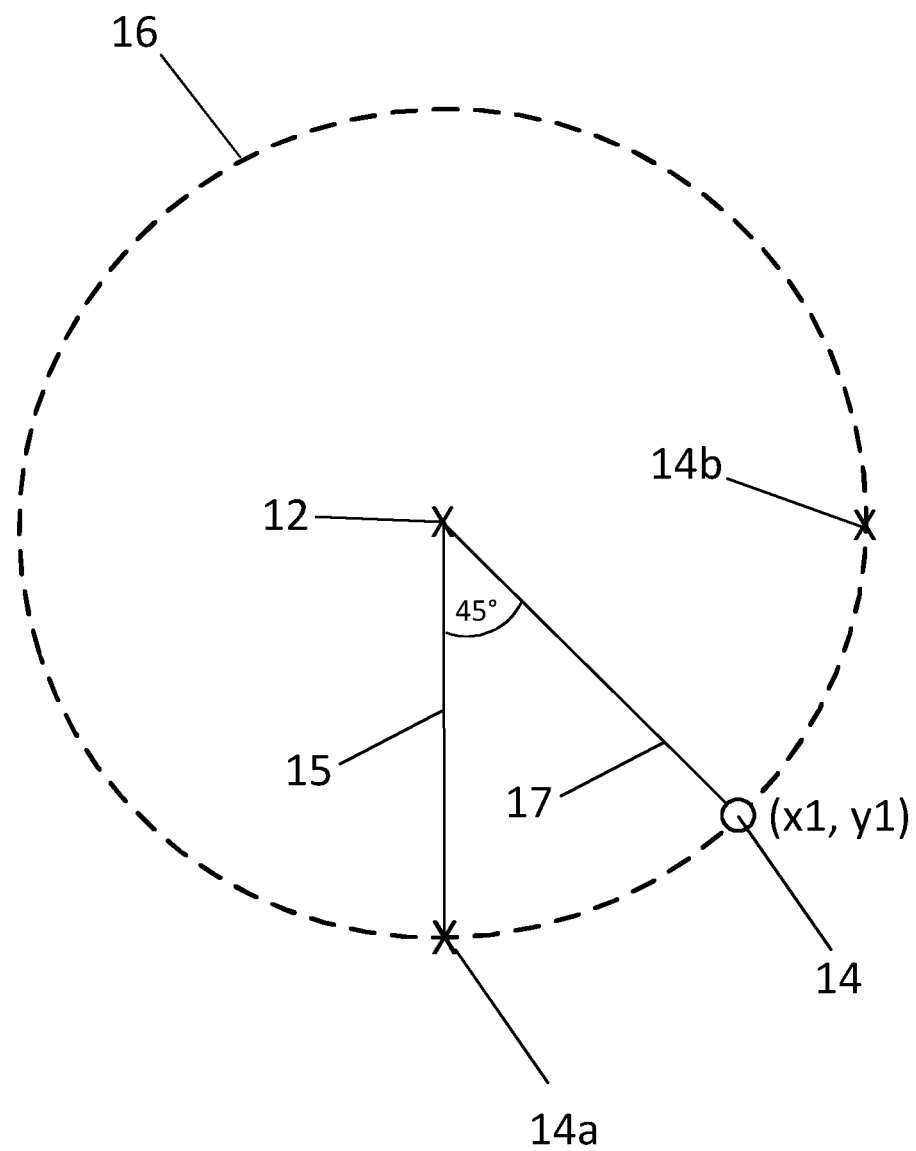
FIG. 2B shows how the orientation of the nacelle may be determined.

FIG. 2B illustrates in more detail how the nacelle orientation may be determined. Position 14a indicates the position of the GNSS sensor 14 when the nacelle is pointing North (corresponding with FIG. 2A). Since the GNSS sensor 14 is mounted centrally on the nacelle, this position 14a is due south of the yaw axis 12. Thus a line 15 from the position 14a to the yaw axis 12 runs in a North-South direction.

The nacelle has yawed anti-clockwise by 45° so it is now pointing North-West and the GNSS sensor 14 has moved to the new position (x1, y1) shown in FIG. 2B. A line 17 from the new position (x1, y1) to the yaw axis 12 runs at a 45° angle to the North-South direction 15. Thus by constructing the line 17, and measuring the angle to the North-South direction 15, the nacelle orientation can be obtained.

The position of the GNSS sensor 14 when the nacelle is pointing North may be obtained in a number of ways.

Preferably the orientation of the nacelle is determined on the basis of a known position of the sensor on the nacelle. The known position of the sensor on the nacelle may be obtained by measurement or by design, as described in the various examples below.

In a first example, if the GNSS sensor 14 is known by design to be accurately mounted centrally (on the centre plane 7 of the nacelle) then it can be assumed that it is due south of the yaw axis 12 when the nacelle is pointing North.

It may not be possible to mount the GNSS sensor 14 centrally on the nacelle, because other equipment must be placed at this central location. Therefore in other examples, the GNSS sensor 14 is not mounted on the centre plane 7 but its position on the nacelle is still known. Thus the position of the GNSS sensor 14 when the nacelle is pointing North may be obtained on the basis of its known position on the nacelle.

For instance, an operator could manually measure the distance d1 from the yaw axis 12 to the GNSS sensor and the distance d2 from the GNSS sensor to the centre plane 7 of the nacelle, and type the distances d1, d2 into the controller. The angular position of the sensor on the nacelle (i.e. the angle d1d3) can then be obtained by trigonometry from the distances d1 and d2. Alternatively the distances d1, d2 may be known by design. Alternatively there may be two or more possible positions, and the distances d1, d2 for each position are known. In this case it is simply necessary to type into the controller which of the possible positions the sensor is occupying. Alternatively the distance d2 may be known (by measurement or design) but the distance d1 may not be known. In this case, the distance d3 from the sensor 14 to the yaw axis 12 can be determined by analysing the calibration position measurements to obtain the radius of the circle 16 (which is the distance d3). The angular position of the sensor (angle d1d3) can then be obtained by trigonometry from the distances d2 and d3.

In all of the examples described above it is not necessary to make a calibration measurement of the orientation of the nacelle, because the GNSS sensor 14 can determine the North-South direction using the satellites. In other words, the GNSS system inherently knowns the North-South direction.

If the position of the GNSS sensor 14 relative to the nacelle is not known, then it may be necessary to make one or more calibration measurements of the orientation of the nacelle. For example, the nacelle may be yawed until it is pointing North, and the (x, y) position of the sensor measured. Alternatively, the orientation of the nacelle may be measured with a compass, and that orientation measurement associated with a particular (x, y) position measurement of the GNSS sensor 14. The line 15 can then be obtained. For example, with reference to FIG. 2B, if the nacelle is pointing West then the GNSS sensor will be at a position 14b. The orientation of the nacelle is measured (in this case) 90° along with the position of the sensor (in this case, (1, 0)). The direction of the line 15 can now be obtained by moving 90° round the circle. This type of calibration process is not preferred, because it is prone to human error.

In the examples above, the orientation of the nacelle is obtained by calculation, based on the new position (x1, y1); the (x, y) coordinates of the yaw axis 12; and the direction of the line 15. In this case the locus data may consist only of the coordinates of the yaw axis 12 at the centre of the circle—no other information being required if the GNSS sensor 14 is accurately mounted centrally on the nacelle. Alternatively, the stored locus data may also include a calibration measurement of the orientation of the nacelle, as described above and/or the position of the sensor on the nacelle (for instance distance d2, distances d1 and d2, angle d1d3 or any other data which can be used to infer the position of the GNSS sensor 14 when the nacelle is pointing North).

In another example, the stored locus data may simply define the origin and orientation of a frame of reference based on the known position of the yaw axis 12 and the position of the GNSS sensor 14 when the nacelle is pointing North. In other words, the frame of reference may be defined so that the yaw axis 12 is at coordinates (0, 0), and the position of the GNSS sensor 14 when the nacelle is pointing North is at coordinates (−1, 0). Thus the orientation of the nacelle can simply be determined by trigonometry based on the coordinates (x1, y1) of the GNSS sensor 14 at the new position. For instance if the new position is (x1, y1) then the orientation of the nacelle may be obtained by trigonometry as $\tan^{-1}(x1/y1)$.

The examples above rely on the assumption that the locus of the GNSS sensor 14 during the calibration routine is a circle 16 centred on the yaw axis 12. In another example, the locus data may comprise a look-up table with a series of calibration position measurements (in any frame of reference) and a nacelle orientation associated with each calibration position measurement. This method does not rely on the assumption that the locus of the GNSS sensor 14 during the calibration routine is a circle 16 centred on the yaw axis 12.

A basic example of such a look-up table is shown in Table 1 below:

TABLE 1

| Calibration position measurement | Nacelle orientation |
|---|---|
| (0, −1) | North |
| (0, 1) | South |
| (−1, 0) | East |
| (1, 0) | West |

In this case, rather than determining the nacelle orientation by calculation, it is determined by identifying a position in the locus data that is closest to the new position; and using the look-up table to retrieve an orientation of the nacelle corresponding with the identified position.

The sensor 14 can be mounted at any location, as long as it rotates along with the nacelle. In the example of FIG. 2A the sensor 14 is mounted on a centre plane 7 of the nacelle, and spaced back from the yaw axis 12 by a distance d1. If the sensor 14 is moved from the position on the nacelle that it occupied during the calibration routine, then its position can no longer be used to measure the nacelle orientation.

Figure 3A:
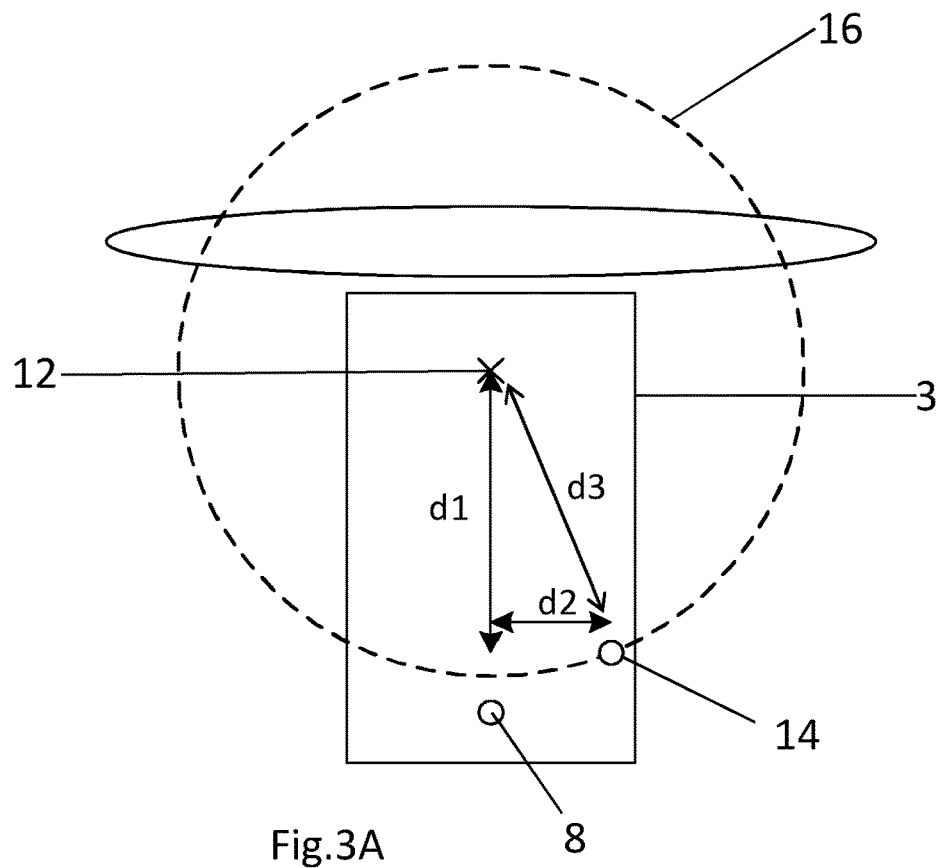
FIG. 3A shows the GNSS sensor offset from the nacelle centre plane.

FIG. 3A illustrates this problem. In this case the GNSS sensor 14 has been moved from the centre plane 7 of the nacelle by a distance d2. The nacelle is pointing North, but the GNSS sensor 14 is now at a position on the circle 16 which would suggest that the nacelle 3 has yawed to the West.

This problem makes it desirable to check the position of the GNSS sensor 14 on the nacelle 3 in order to ensure that it has not been moved since the locus data has been obtained in the calibration routine.

Figure 3B:
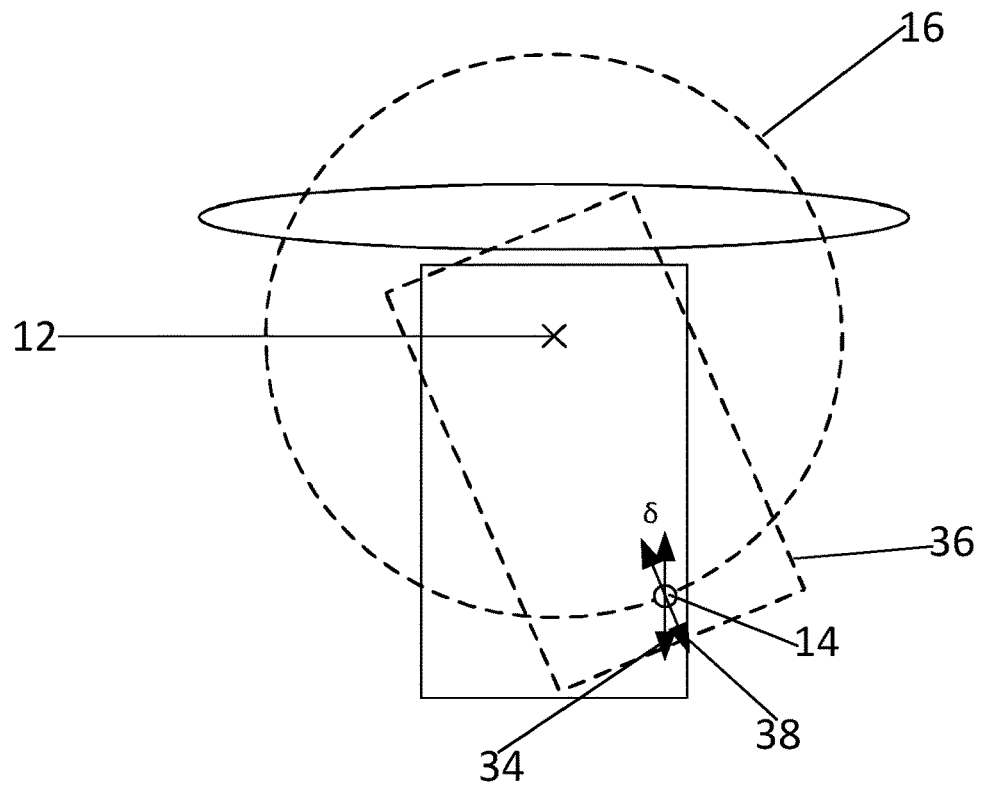
FIG. 3B shows how a correction angle can be measured.

FIG. 3B shows how this problem may be solved. The nacelle 3 carries an accelerometer 8 that detects vibrations of the nacelle 3, which take place most prominently in the longitudinal direction of the nacelle 3, i.e. in the direction the nacelle is facing. For example, if the nacelle 3 is facing North, then the nacelle 3 will vibrate in a North-South direction.

The accelerometer 8 may be a two-axis accelerometer so it can sense both the amplitude and direction of the vibration. The accelerometer 8 may be carried by the nacelle, or it may be carried by any other part of the wind turbine which vibrates in line with the nacelle. The accelerometer 8 may also be built into the GNSS sensor 14, so they are essentially in the same position.

If the GNSS sensor 14 is located on the centre plane 7 then the vibration direction will be radial—in other words the vibration will be towards and away from the yaw axis 12 at the centre of the circle 16 as indicated by arrow 38, in line with a radius of the circle. If the sensor 14 is not lying on the centre plane 7 of the nacelle (either because it has been moved from the centre plane 7, or has always been offset from the centre plane 7 by a distance d2) then the vibration direction will not be radial. This is indicated by North-South arrow 34 which does not point towards the yaw axis 12. Thus by sensing whether the vibration direction is radial, it is possible to infer the position of the GNSS sensor 14 and in particular determine the angle d1d3. This angle d1d3 can therefore be determined by sensing the angle between the vibration direction and the radial direction.

If the sensor is at this position during the calibration position measurements, then the angle d1d3 obtained as described above via the accelerometer 8 may be stored as part of the locus data and used to determine the nacelle orientation. If the sensor is on the centre plane 7 during the calibration position measurements, and subsequently moved by distance d2, then the angular position (angle d1d3) obtained as described above via the accelerometer 8 may be used to apply a correction to the nacelle orientation measurement as described below.

Figure 3C:
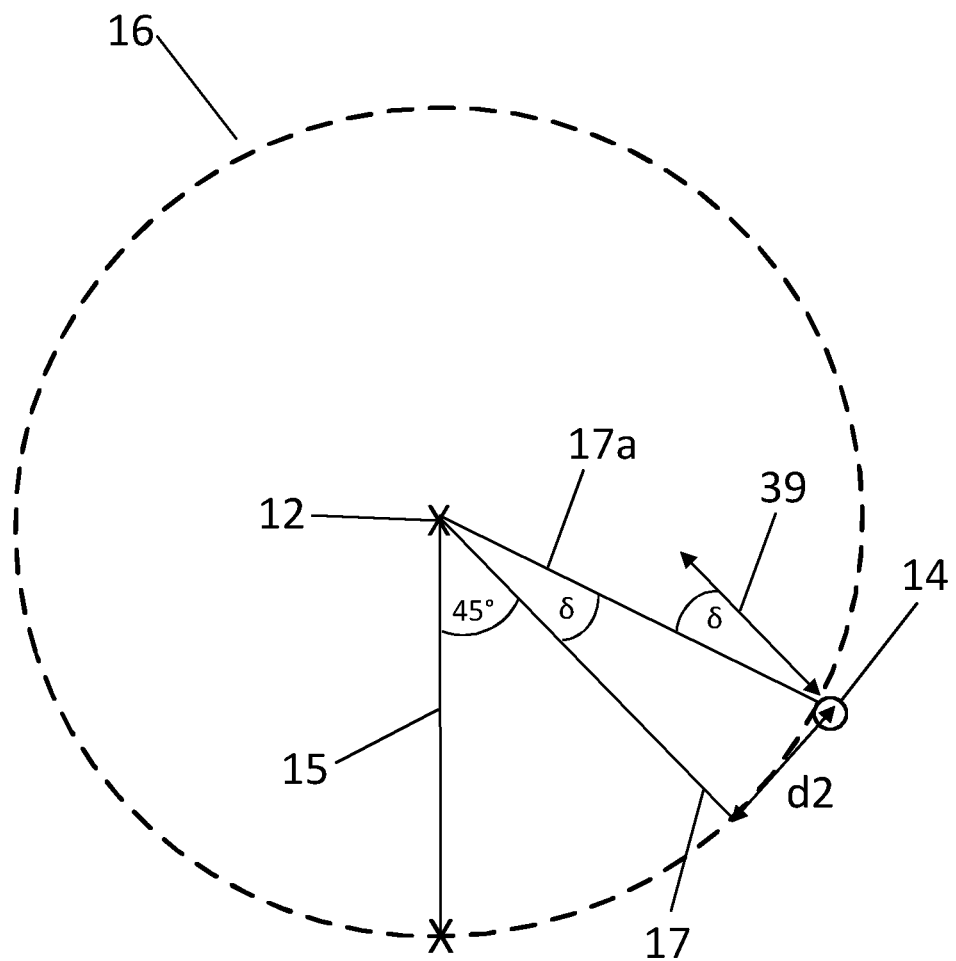
FIG. 3C shows how the correction angle can be used to correct the measurement of nacelle orientation.

Specifically, a correction angle δ between the vibration direction 34 and the radial direction can then be determined, and used to apply a correction to the nacelle orientation measurement. The correction process is illustrated in FIG. 3C. FIG. 3C corresponds with FIG. 2B except the GNSS sensor 14 has been moved by distance d2. The direction 39 of the vibration is measured, the correction angle δ between the lines 17a and 39 is measured; an angle θ between the lines 17a and 15 is measured; and the corrected nacelle orientation measurement is then obtained as θ-δ.

Figure 4:
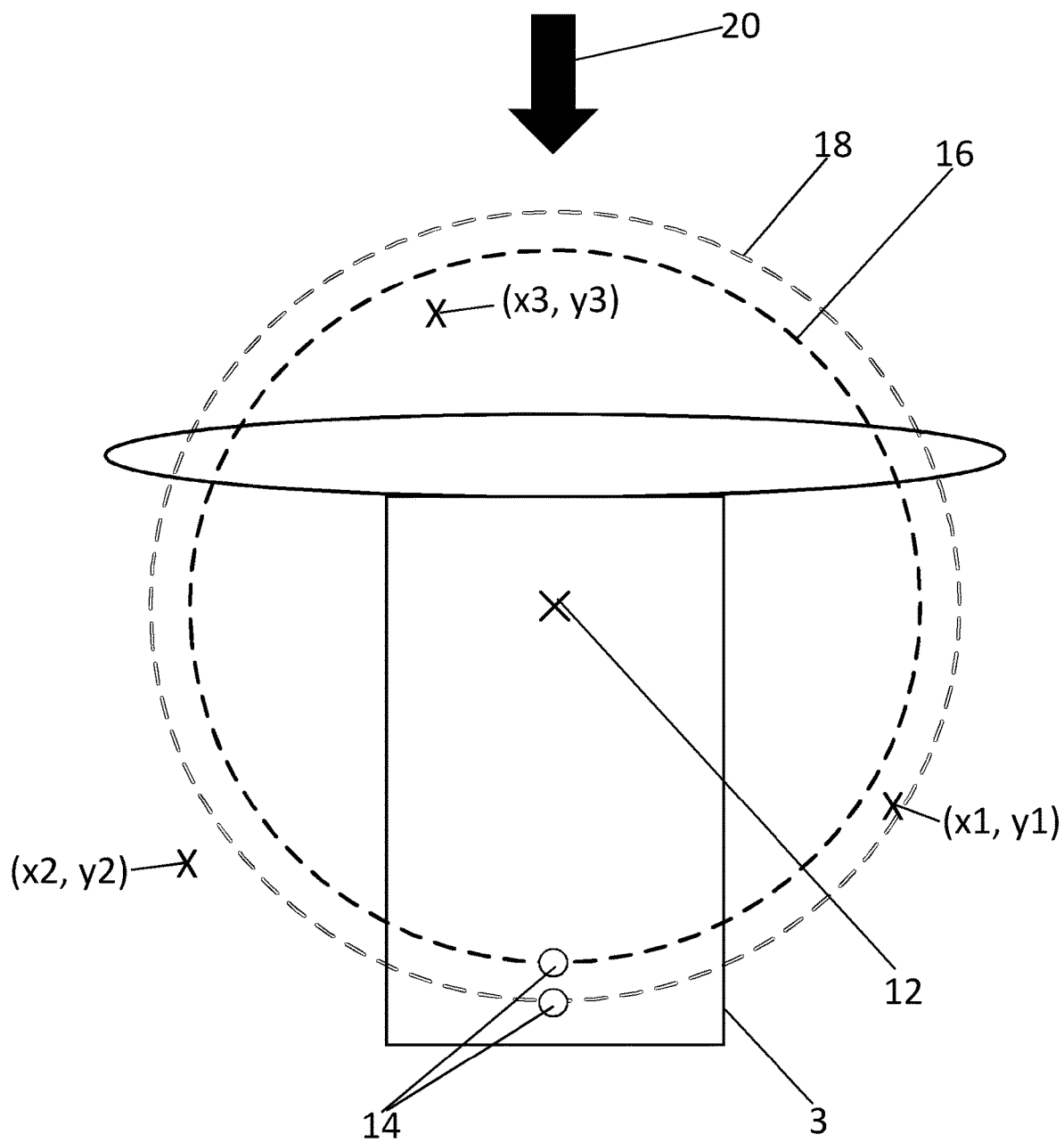
FIG. 4 shows a top-down view of the nacelle of FIG. 1 experiencing a thrust force.

Turning now to FIG. 4, locus data indicative of more than one locus 16, 18 may be obtained. For a given orientation therefore, the GNSS sensor 14 may measure a different position depending on the thrust experienced by the nacelle 3.

In a first scenario in which negligible thrust is experienced by the nacelle 3, the GNSS sensor 14 may obtain a first set of locus data by measuring a first series of calibration positions. The first set of locus data is indicative of a first locus 16.

In a second scenario in which a thrust 20 is experienced by the nacelle 3, the GNSS sensor 14 obtains a second set of locus data by measuring a second set of calibration positions. The second set of locus data is indicative of a second locus 18. At each position on the locus 18, the magnitude of the thrust is the same but the direction of the thrust is different. The loci 16, 18 may be concentric circles, centred on the yaw axis 12.

As can be seen, the first and second loci 16, 18 are both circles, with the second locus 18 having a larger radius than the first locus 16. This is because when the nacelle 3 experiences a thrust 20, the tower 2 carrying the nacelle 3 bends. This causes the nacelle and the GNSS sensor 14 to move. Depending on which direction the thrust 20 is coming from and which way the nacelle 3 is facing, the tower 2 will bend in a different direction.

A new position can then be measured with the GNSS sensor 14; and the orientation of the nacelle determined on the basis of the stored locus data for the two circles 16, 18. This may be done in a number of different ways. For example if the new position falls on one of the circles 16, 18 then the locus data for that circle may be used to determine the nacelle orientation; and if the new position does not fall on one of the circles 16, 18 then the closest circle may be chosen. For example for new positions (x1, y1) and (x2, y2) the chosen closest calibration position in the look-up table may be on the larger (high thrust) circle 18, and for position (x3, y3) the chosen closest calibration position in the look-up table may be on the smaller (low thrust) circle 16.

The larger circle 18 may be measured over time by making calibration measurements during times of high wind speed and regularly updating the circle until the highest radius circle has been measured. Peak thrust of a typical wind turbine may be at a fairly low wind speed (for example 9 m/s) so the largest possible circle should be possible to measure fairly quickly.

In this example, only two circles are measured: a circle 16 associated with a low (or zero) thrust and a circle 18 associated with maximum thrust. Alternatively one or more further circles may be measured: for instance a third circle between the circles 16, 18 and associated with a medium thrust. If a higher number of circles is measured, then the new position is more likely to fall on (or close to) one of them so the estimation of nacelle orientation from the look-up table(s) may be more accurate.

Figure 5:
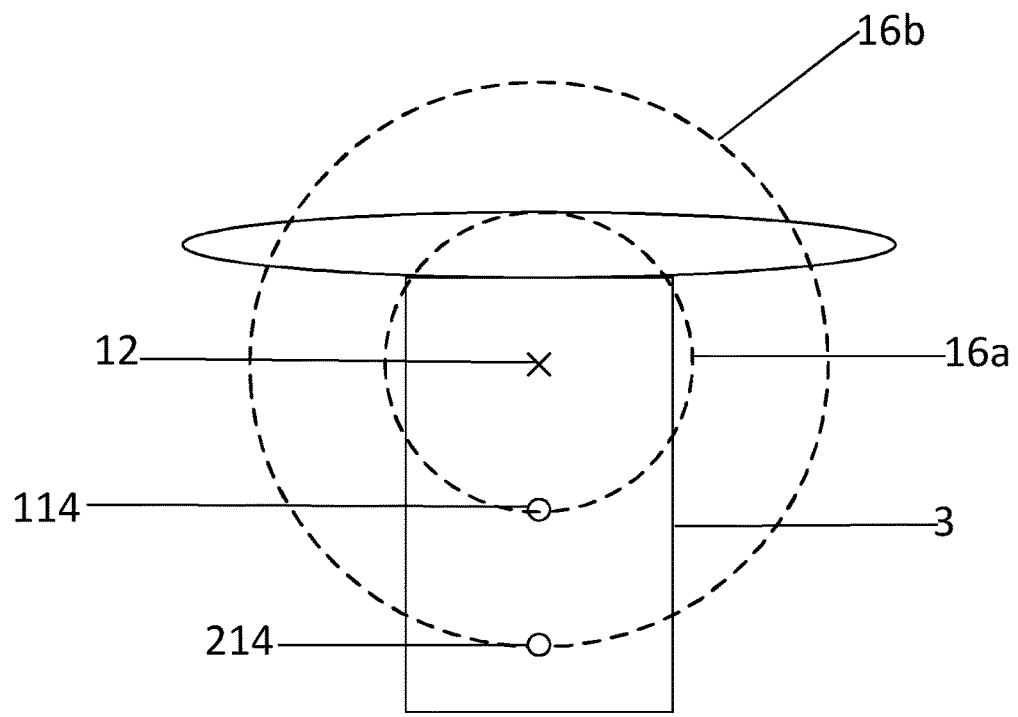
FIG. 5 shows a top-down view of a nacelle according to a further embodiment.

FIG. 5 illustrates an embodiment with two GNSS sensors 114, 214 carried by the nacelle 3 and spaced apart in a fore-aft direction. In this embodiment, locus data is obtained, the locus data being based on a respective series of calibration positions measured by each GNSS sensor 114, 214. The locus data may comprise two look-up tables. Each look-up table corresponds to the series of calibration positions measured by one of the GNSS sensors 114, 214 on a respective locus 16a, 16b. The GNSS sensors 114, 214 lie on different loci 16a, 16b because they are at different distances from the yaw axis 12.

After storing the locus data, a new position of each GNSS sensor 114, 214 is measured. These new positions are compared with the stored locus data to determine the orientation of the nacelle 3. More specifically, each new position may be input into the look-up table that corresponds to the GNSS sensor 114, 214 that obtained the new position.

Figure 6:
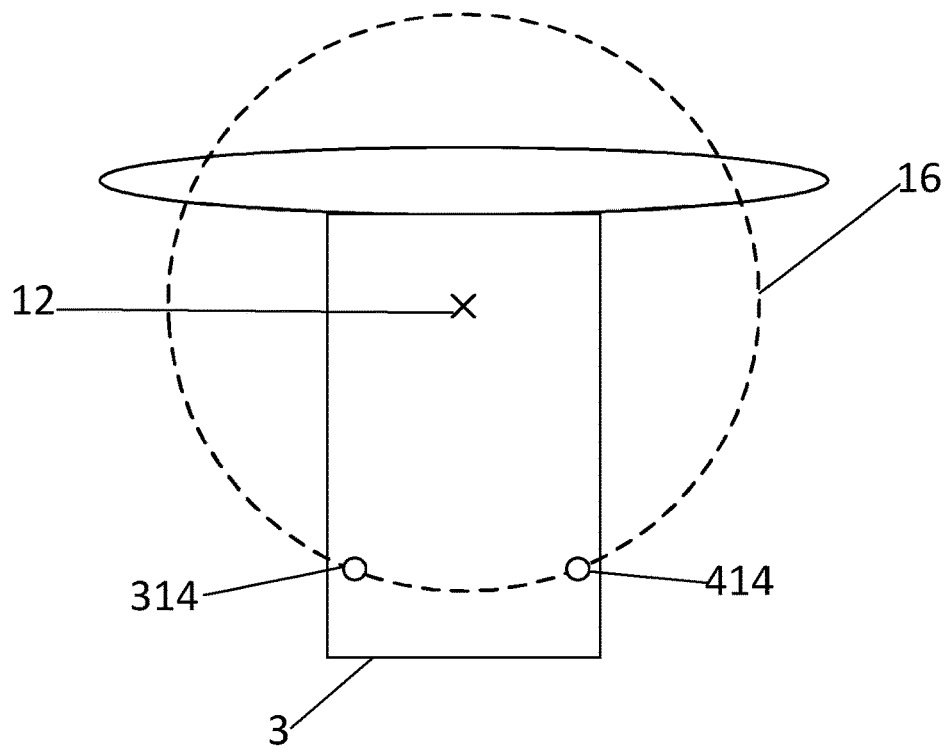
FIG. 6 shows a top-down view of a nacelle according to yet a further embodiment.

FIG. 6 illustrates an embodiment with two GNSS sensors 314, 414 carried by the nacelle 3 and spaced apart in a side-to-side direction. In this embodiment, both GNSS sensors 314, 414 measure the same series of calibration positions because they lie on the same locus as one another. This is because both GNSS sensors 314, 414 are equidistant from the yaw axis 12. The locus data obtained is therefore typically indicative of a locus 16 comprising a single circle, upon which both GNSS sensors 314, 414 lie.

As discussed with respect to previous embodiments, the locus data is stored and after storing the locus data, a new position of each GNSS sensor 314, 414 is measured. The orientation of the nacelle 3 is determined on the basis of the stored locus data and the measured new positions.

Use of multiple GNSS sensors provides the advantage of providing a more accurate, more reliable indication of the orientation of the nacelle.

Figure 7:
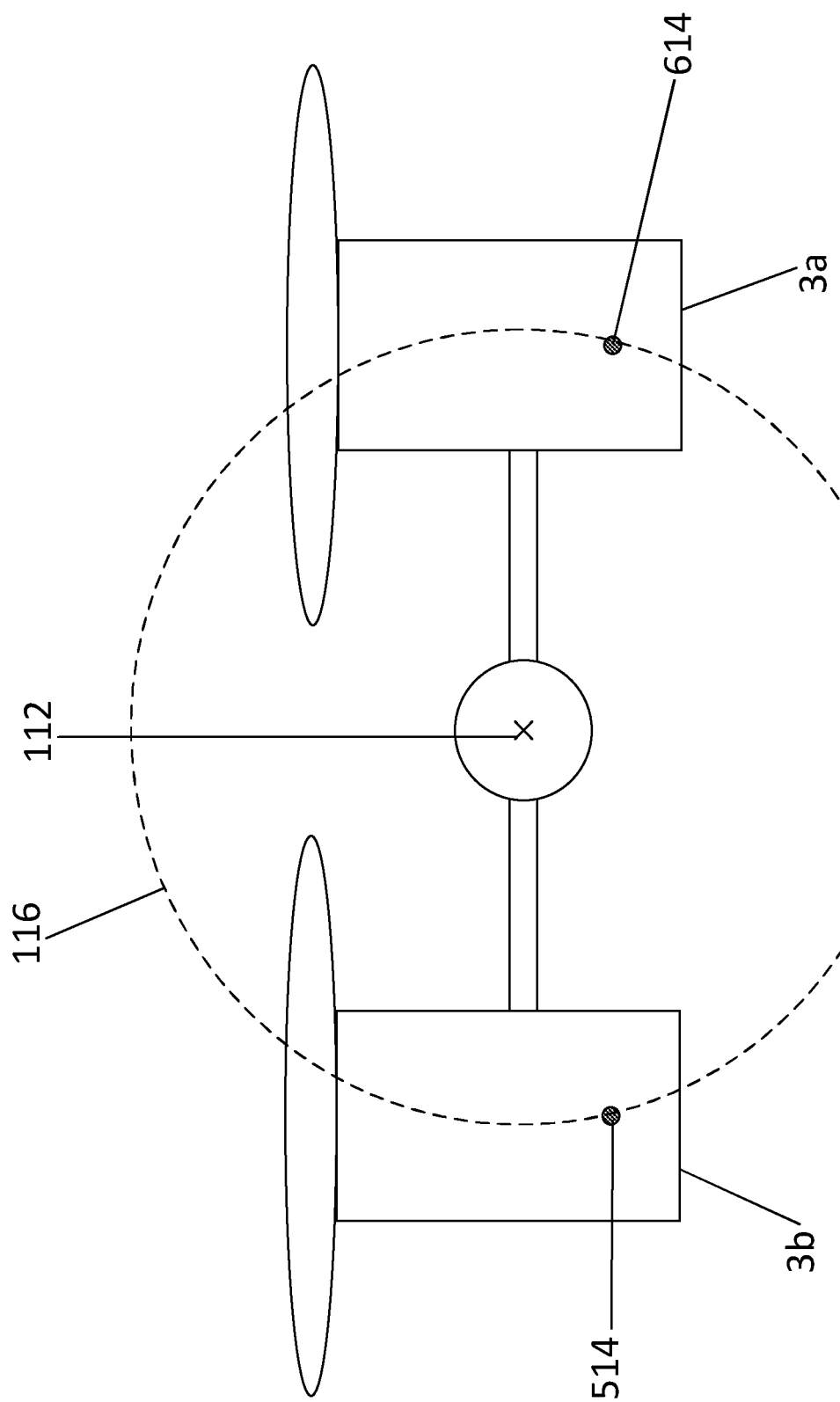
FIG. 7 shows a top-down view of a nacelle according to yet a further embodiment.

Turning now to FIG. 7, a wind turbine with two rotor-nacelle assemblies (RNAs) is shown. Each RNA comprises a respective nacelle 3A, 3B which carries a respective GNSS sensor 514, 614. The RNAs rotate about a common yaw axis 112. Both GNSS sensors 514, 614 are equidistant from the yaw axis 112, so they follow the same locus 116 when the RNAs are yawed.

As described previously, locus data is obtained based on a series of calibration positions measured by each GNSS sensor 514, 614. It is also possible, in the case where the GNSS sensors 514, 614 lie on the same locus 116, for just one of the GNSS sensors 514, 614 to measure the series of calibration positions, and for the other sensor to not measure these positions, so as to avoid redundancy. The locus data is stored.

As discussed before, after storing the locus data, a new position of each GNSS sensor 514, 614 is measured. The orientation of the nacelle 3 is then determined on the basis of the stored locus data and the measured new positions.

Although the invention has been described above with reference to one or more preferred embodiments, it will be appreciated that various changes or modifications may be made without departing from the scope of the invention as defined in the appended claims.

The invention claimed is:

1. A method of determining an orientation of a nacelle of a wind turbine, wherein the nacelle carries a Global Navigation Satellite System (GNSS) sensor, the method comprising:
   yawing the nacelle between a series of orientations;
   at each orientation of the series of orientations, measuring a calibration position with the GNSS sensor to generate a series of calibration positions each associated with a respective orientation of the series of orientations;
   defining locus data based on the series of calibration positions and their respective orientations;
   storing the locus data;
   after storing the locus data, measuring a new position with the GNSS sensor; and
   determining the orientation of the nacelle on the basis of the stored locus data and the new position.

2. The method of claim 1, wherein determining the orientation of the nacelle comprises identifying a position in the locus data that is closest to the new position; and identifying an orientation of the nacelle corresponding with the identified position.

3. The method of claim 1, wherein the orientation of the nacelle is determined by measuring a thrust experienced by the wind turbine during the measurement of the new position, and determining the orientation of the nacelle on the basis of the measured thrust.

4. The method of claim 1, wherein the locus data comprises multiple sets of locus data, each set of locus data corresponding to a different level of thrust experienced by the wind turbine.

5. The method of claim 4, wherein each set of locus data is obtained by yawing the nacelle between a respective series of orientations with the wind turbine experiencing a respective one of the different levels of thrust; and each set of locus data is defined on the basis of a respective series of calibration positions measured by the GNSS sensor and their respective orientations.

6. The method of claim 4, wherein the orientation of the nacelle is determined by selecting one of the sets of locus data based on the new position, and determining the orientation of the nacelle on the basis of the selected one of the sets of locus data.

7. The method of claim 1, further comprising the step of determining a correction angle associated with a position of the GNSS sensor on the nacelle, and determining the orientation of the nacelle on the basis of the correction angle.

8. The method of claim 7, wherein the correction angle is determined by using an accelerometer to determine a direction of vibration of the wind turbine, and determining the correction angle on the basis of the direction of vibration.

9. The method of claim 1, wherein the calibration positions and the new position are measured by the GNSS sensor relative to a constellation of satellites and a terrestrial base module.

10. The method of claim 1, wherein:
   the nacelle carries multiple Global Navigation Satellite System (GNSS) sensors,
   the series of calibration positions includes calibration positions measured by each of the GNSS sensors,
   the locus data is defined based on the series of calibration positions measured by the GNSS sensors, wherein each calibration position is measured by the GNSS sensors when the nacelle is in a respective orientation of the series of orientations;
   the GNSS sensors each measure a respective new position; and
   the orientation of the nacelle is determined based on the stored locus data and the new positions of the GNSS sensors.

11. The method of claim 1, wherein the orientation of the nacelle determined by the method is a geographic bearing.

12. The method of claim 1, wherein the locus data comprises a collation of the calibration positions, or a geometrical function based on the calibration positions.

13. The method of claim 1, wherein the orientation of the nacelle is determined on the basis of a known position of the GNSS sensor on the nacelle.

14. The method of claim 13, wherein the known position of the GNSS sensor on the nacelle is obtained by measurement or by design.

15. The method of claim 1, further comprising determining an angular position of the GNSS sensor on the nacelle by using an accelerometer to determine a direction of vibration of the wind turbine, and determining the angular position of the GNSS sensor on the nacelle on the basis of the direction of vibration.

16. A wind turbine comprising:
   a tower;
   a nacelle rotatably mounted on the tower;
   a Global Navigation Satellite System (GNSS) sensor carried by the nacelle; and
   a control system configured to:
      yaw the nacelle between a series of orientations;
      at each orientation of the series of orientations, measure a calibration position with the GNSS sensor to generate a series of calibration positions each associated with a respective orientation of the series of orientations;

define locus data based on the series of calibration positions measured by the GNSS sensor and their respective orientations;

store the locus data;

after storing the locus data, measure a new position with the GNSS sensor; and determine an orientation of the nacelle on the basis of the stored locus data and the new position.

17. The method of claim 1, wherein determining the orientation of the nacelle on the basis of the stored locus data and the new position includes:

defining a frame of reference based on the stored locus data;

converting the new position into the defined frame of reference; and determining the orientation of the nacelle based on the converted new position.

* * * * *